Jan. 30, 1934.  L. D. KAY  1,945,277
DUAL TIRED TRUCK WHEEL
Filed July 3, 1928
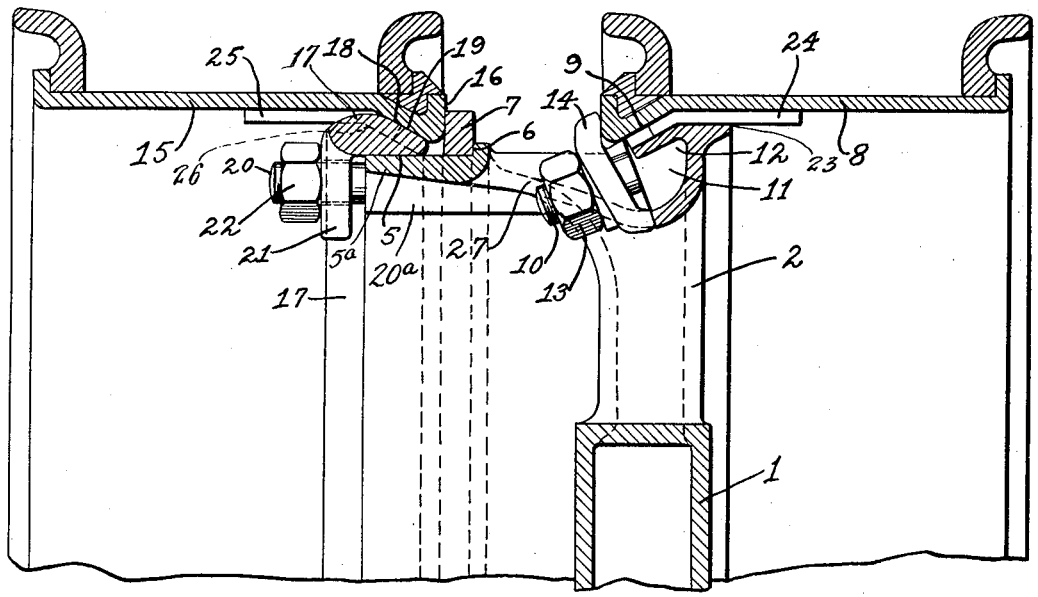
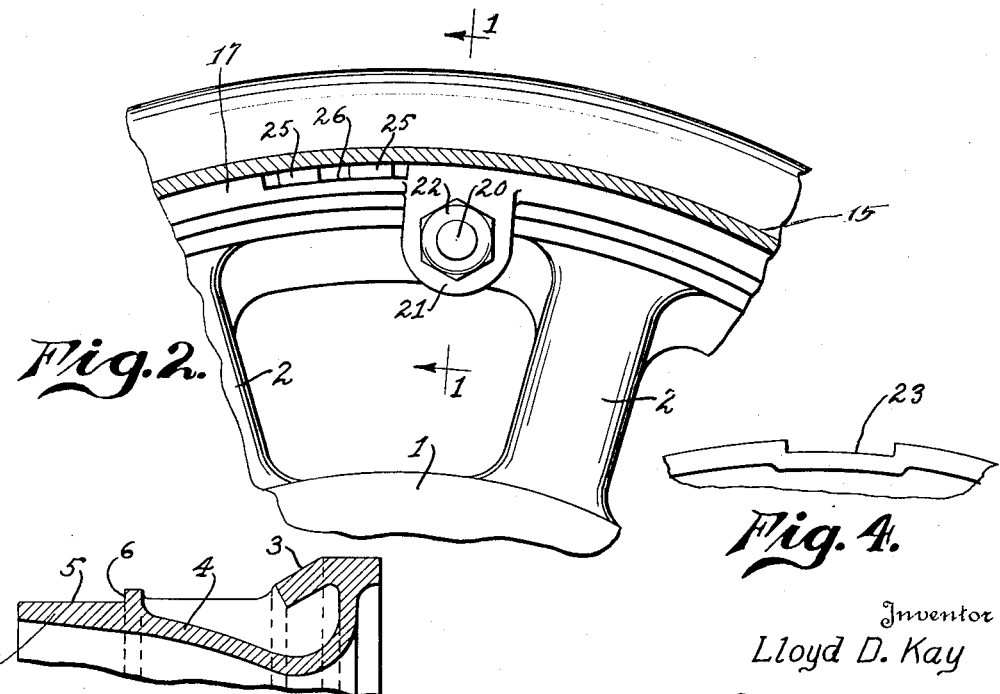
Inventor
Lloyd D. Kay
Lyon & Lyon
Attorneys Patented Jan. 30, 1934

1,945,277

UNITED STATES PATENT OFFICE 1,945,277

DUAL TIRED TRUCK WHEEL

Lloyd D. Kay, Los Angeles, Calif., assignor to Kay-Brunner Steel Products Inc., a corporation Application July 3, 1928. Serial No. 290,142

3 Claims. (Cl. 301—13)

This invention relates to a dual tired wheel, and the invention is particularly adapted for use in connection with truck wheels. The general object of the invention is to produce a wheel of this type which will be of relatively light weight, but which will afford means for readily putting the tire rims in place upon it; also to provide a wheel of this type in which the inboard and outboard tire rim seats are so constructed as to enable tire rims to be used which are duplicates of each other in construction. This enables standard tire rims to be used readily in inboard or outboard positions.

A further object of the invention is to provide a construction for such a wheel as will enable the studs for the inboard tire rim to be readily accessible from the outboard side of the wheel.

Further objects of the invention will appear hereinafter.

The invention consists of novel parts and combination of parts to be described hereinafter, all of which contribute to produce an efficient dual tired truck wheel.

A preferred embodiment of the invention is described in the following specification, while the broad scope of the invention is pointed out in the appended claims.

In the drawing:

Figure 1 is a section in a radial plane through a dual tired wheel embodying my invention. This view may be considered a section on the line 1—1 of Figure 2.

Figure 2 is a side elevation showing a portion of the rim and the wheel illustrated in Figure 1.

Figure 3 is a typical cross section through the rim of the wheel.

Figure 4 is a side elevation showing a short portion of the inner edge, or rim, of the wheel at its inboard side.

In practicing the invention I provide a wheel which is preferably adapted to be made of cast steel and embodying in its construction a hub 1, with spokes 2. Preferably in line with the plane of the spokes 2, I provide the wheel rim with an integral inboard seat 3 which, in the present instance, is substantially conically curved in form. The wheel rim 4 is of a type already patented to me, and has a shallow dished cross section with the metal that forms the seat 3 overhanging the inboard edge of the "dish". Toward its outboard side the wheel is provided with an outboard felloe 5a with a substantially cylindrical face 5 terminating at its inboard edge in a shoulder 6. This shoulder does not project out radially to a great extent, but operates as a seat for a continuous solid steel stop ring 7.

Before the stop ring 7 has been put in place the inboard tire-rim 8 can be readily slipped over the shoulder 6 from the outboard side. This rim is of standard form and is provided at its outboard edge with an inclined, or conically curved, seat face 9 that seats upon the conically curved seat 3 so that the inboard portion of the rim overhangs the inboard side of the wheel.

This rim is secured in place by clamping means mounted on the wheel adjacent the seat 3 and constructed so that the same is accessible from a point posed towards the axis of the wheel. In other words, I prefer to employ clamping studs 10 mounted in bosses 11 cast in the wheel in the angle 12 of the "dish" formed under the projecting seat 3.

The axes of these studs are inclined, as indicated in Figure 1, so that they extend towards the axis of the wheel at the outboard side. On these studs ordinary nuts 13 can be applied which seat up against ordinary clamping lugs 14, the edges of the lugs engaging the outboard edge of the rim 8.

The outboard rim 15 is a duplicate in construction of the inboard rim 8. Its inboard edge 16 seats against the outboard face of the stop ring 7. This tire rim, as stated, is preferably a duplicate in construction of the rim 8, but this is not essential. In addition, I provide a keeper ring 17 that slides over the cylindrical face 5 and cooperates with the stop ring 7 to secure the outboard rim 15 in place. In the present instance, when the tire rims are duplicates of each other, the tire rim 15 has an inclined or conically curved seat face 18 on its outboard side, adjacent the edge 16. After this rim has been put in place the keeper ring 17 is slid over the cylindrical face 5. In the present instance, this keeper ring is formed with an inclined or conically curved outer face 19 that engages the seat face 18 and constitutes a seat for the outboard rim. In order to secure the outboard rim in place clamping studs 20, or other means, is provided on the outboard edge of the wheel. In the present instance, this wedge ring is provided with integral lugs 21 through which the studs 20 pass, a nut 22 being provided on each stud to seat against its corresponding lug 21 and jam the wedge ring into the angle between the seat face 18 and the cylindrical face 5. The clamping studs 20 are received in the ends of integral posts 20a. These posts unite the inboard and outboard felloes.

Any suitable means may be provided for driving the wheel from the tire rims. In the present instance, the inboard edge of the wheel is provided with a wide shallow notch 23, (see Figure 4) to receive driving lugs or tongues 24 welded onto the inner face of the tire rim 8. Similar driving lugs 25 are provided on the inner face of the outboard rim and these are received in a wide shallow groove 26 (see Figure 2) formed in the outer face of the wedge ring.

It is not necessary that the inner diameter of the stop ring 7 should fit accurately to the diameter of the wheel at the cylindrical face 5. However, this ring should be a stout solid ring of steel and is preferably not a split ring. The wedge ring 17 is also preferably not of split ring type.

There may be as many of the studs 10 and studs 20 as are desired. At the points where the studs 10 are located the rim 4 of the wheel is formed with an opening 27 to make clearance at this point for the lugs 14 and the clamping nuts 13.

It is understood that the embodiment of the invention described herein is only one of the many embodiments this invention may take, and I do not wish to be limited in the practice of the invention, nor in the claims, to the particular embodiment set forth.

What I claim is:

1. A dual-tired truck wheel having a body with a single integral inboard felloe having a substantially conically curved seat with the small end of the "cone" of the seat disposed toward the outboard side of the wheel, said inboard felloe having clamping studs for the inboard tire rim mounted in the same adjacent to the inboard tire rim seat and disposed adjacent to the smaller end of said inboard seat with their axes inclining toward the axis of the wheel, said wheel having a single outboard seat with means for securing an outboard tire rim upon the same.

2. A dual-tired wheel having an integral wheel rim with an outboard felloe with an integral annular shoulder, a continuous stop-ring seating against said shoulder, means cooperating with the stop-ring for securing an outboard tire rim on the wheel, said wheel having an integral inboard seat located toward its inboard side to receive the inboard tire rim from the outboard side of the wheel, passed over the said outboard felloe before the stop-ring is put in place, said wheel having an open space between the outboard felloe and the inboard felloe, clamping studs with clamping nuts located radially inward from the inboard seat with their axes located in an inclined direction and extending toward the axis of the wheel at the outboard side, thereby rendering the clamping nuts accessible at all times from the outboard side of the wheel and from a point within the radius of the outboard felloe, and lugs carried by the inclined clamping studs and projecting radially outward into the said space for engaging the outboard edge of the inboard tire rim to secure the same on its seat.

3. A dual-tired truck wheel having a body with a single integral inboard felloe having a substantially conically curved seat with the small end of the "cone" of the seat disposed toward the outboard side of the wheel, said inboard felloe having clamping studs for the inboard tire rim mounted in the same adjacent to the inboard tire rim seat and disposed adjacent to the smaller end of said inboard seat with their axes inclining toward the axis of the wheel, said wheel having a cylindrical face toward its outboard side with an annular shoulder located at the inboard end of the cylindrical face, said shoulder having a stop face located in a plane substantially at right angles to the axis of the wheel, a continuous stop-ring seating against said shoulder, and means for clamping an outboard tire rim against said continuous stop-ring, said shoulder being of a diameter to permit the inboard tire rim to be passed over the outboard end of the wheel before the stop-ring has been put in place.

LLOYD D. KAY.